(12) United States Patent
Erickson

(10) Patent No.: US 11,338,363 B2
(45) Date of Patent: May 24, 2022

(54) THREE-DIMENSIONAL PRINTING

(71) Applicant: HEWLETT-PACKARD DEVELOPMENT COMPANY, L.P., Houston, TX (US)

(72) Inventor: Kristopher J. Erickson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 956 days.

(21) Appl. No.: 16/077,330

(22) PCT Filed: Jun. 28, 2017

(86) PCT No.: PCT/US2017/039790
§ 371 (c)(1),
(2) Date: Aug. 10, 2018

(87) PCT Pub. No.: WO2019/005048
PCT Pub. Date: Jan. 3, 2019

(65) Prior Publication Data
US 2021/0205879 A1 Jul. 8, 2021

(51) Int. Cl.
*B22F 1/10* (2022.01)
*B22F 10/10* (2021.01)
(Continued)

(52) U.S. Cl.
CPC ............... *B22F 1/10* (2022.01); *B22F 1/054* (2022.01); *B22F 10/10* (2021.01); *B22F 12/20* (2021.01);
(Continued)

(58) Field of Classification Search
CPC ........... B22F 1/0059; B22F 1/10; B33Y 10/00
(Continued)

(56) References Cited

U.S. PATENT DOCUMENTS

| 6,048,954 A | 4/2000 | Barlow et al. |
| 7,389,154 B2 | 6/2008 | Hunter |

(Continued)

FOREIGN PATENT DOCUMENTS

| CN | 1950192 A | 4/2007 |
| CN | 102744172 B | 4/2015 |

(Continued)

OTHER PUBLICATIONS

"Binder Jetting Additively Your Access to 3D Printing", Binder Jetting, Retrieved from Internet: https://www.additively.com/en/learn-about/binder-jetting. May 26, 2017, 8 Pages.

*Primary Examiner* — Weiping Zhu
(74) *Attorney, Agent, or Firm* — Dierker & Kavanaugh PC

(57) ABSTRACT

At a print temperature, a layer (having a predetermined height) of metal build material particles is formed. Also at the print temperature, a fluid containing metal nanoparticles is selectively applied to at least a portion of the layer, and at a fluid loading that wets the portion through the predetermined height without saturating the portion. The metal nanoparticles are exposed to a sintering temperature that is higher than the print temperature and at least 500° below a melting point of the metal build material particles using a predetermined number of heating events taking place at a predetermined speed or for a predetermined time, and separated by a predetermined delay time, to bind the metal build material particles together to form a bound layer. A build material surface is cooled to or below the print temperature. The forming, selectively applying, exposing, and cooling are repeated to form a part precursor.

16 Claims, 8 Drawing Sheets

(51) Int. Cl.
*B22F 12/20* (2021.01)
*B22F 12/90* (2021.01)
*B22F 1/054* (2022.01)
*B33Y 10/00* (2015.01)
*B33Y 30/00* (2015.01)
*B33Y 40/00* (2020.01)
*B33Y 50/02* (2015.01)
*B33Y 70/10* (2020.01)

(52) U.S. Cl.
CPC .......... *B22F 12/90* (2021.01); *B22F 2998/10* (2013.01); *B22F 2999/00* (2013.01); *B33Y 10/00* (2014.12); *B33Y 30/00* (2014.12); *B33Y 40/00* (2014.12); *B33Y 50/02* (2014.12); *B33Y 70/10* (2020.01)

(58) Field of Classification Search
USPC ............................................................ 419/6
See application file for complete search history.

(56) References Cited

U.S. PATENT DOCUMENTS

| | | | |
|---|---|---|---|
| 9,581,590 | B2 | 2/2017 | Alocilja et al. |
| 2005/0001356 | A1 | 1/2005 | Tochimoto |
| 2016/0339517 | A1 | 11/2016 | Joshi et al. |
| 2016/0368054 | A1 | 12/2016 | Ng et al. |
| 2017/0014911 | A1 | 1/2017 | Ng et al. |

FOREIGN PATENT DOCUMENTS

| | | | | |
|---|---|---|---|---|
| CN | 105848838 A | 8/2016 | | |
| CN | 105881695 A | 8/2016 | | |
| CN | 106009441 A | 10/2016 | | |
| CN | 105189092 B | 3/2017 | | |
| CN | 106794623 B | 8/2019 | | |
| TW | 201609606 A | 3/2016 | | |
| WO | 2006049619 A1 | 5/2006 | | |
| WO | WO-2009017648 | 2/2009 | | |
| WO | WO-2009017648 A1 * | 2/2009 | ........... | C09D 11/322 |
| WO | WO-2015162905 | 10/2015 | | |
| WO | 2016053305 A1 | 4/2016 | | |
| WO | 2016209696 A1 | 12/2016 | | |
| WO | 2017037165 A1 | 3/2017 | | |

\* cited by examiner

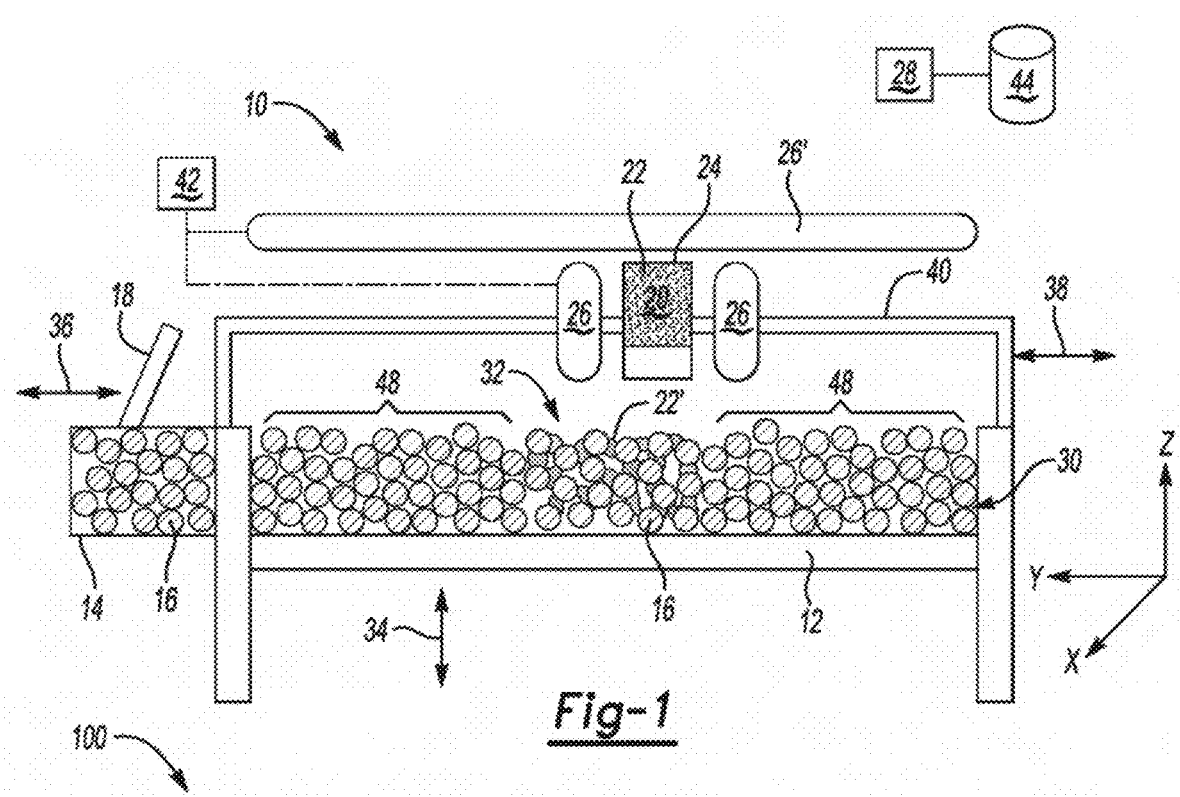

- 102 — At a Print Temperature:
Forming a Layer of Metal Build Material Particles, the Layer having a Predetermined Height; and Selectively Applying a Fluid Containing Metal Nanoparticles to at least a Portion of the Layer, and at a Fluid Loading that Wets the Portion Through the Predetermined Height without Saturating the Portion

- 104 — Exposing the Metal Nanoparticles to a Sintering Temperature that is Higher than the Print Temperature and at least 500° below a Melting Point of the Metal Build Material Particles Using a Predetermined Number of Heating Events Taking Place at a Predetermined Speed or for a Predetermined Time and Separated by a Predetermined Delay Time, thereby Binding the Metal Build Material Particles Together to Form a Bound Layer

- 106 — Cooling a Build Material Surface to or Below the Print Temperature

- 108 — Then Repeating the Forming, the Selectively Applying, and the Exposing to form a Part Precursor

*Fig-2*

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 a simplified isometric and schematic view of an example of a 3D printing system disclosed herein;

FIG. 2 is a flow diagram illustrating examples of a 3D printing method disclosed herein;

DETAILED DESCRIPTION

Figure 3A:
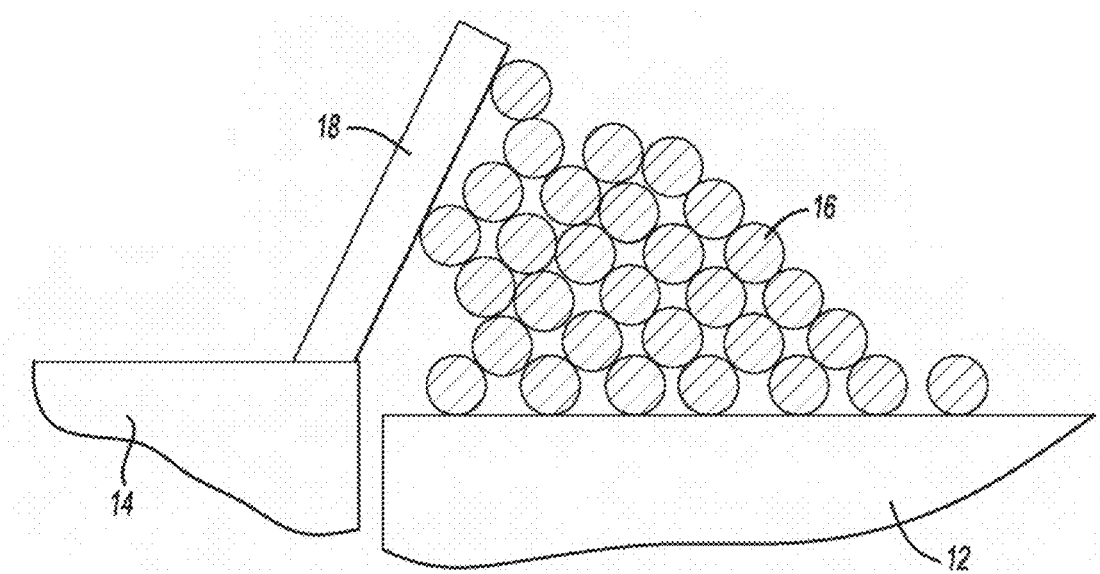
FIGS. 3A through 3C are schematic and partially cross-sectional views depicting the formation of a part precursor using an example of a 3D printing method disclosed herein.

In some examples of the three-dimensional (3D) printing method disclosed herein, a fluid containing metal nanoparticles is selectively applied to a layer of metal build material particles, and then the layer is heated to a temperature that will sinter or melt the metal nanoparticles without sintering or melting the metal build material particles. The sintered or melted metal nanoparticles form metal connections that bind the metal build material particles together. These processes may be repeated to form a part precursor (also referred to herein as a green part, which is also known as a green body) of the 3D part that is ultimately to be formed.

As used herein, the terms "part precursor" and "green part" refer to an intermediate part that has a shape that is larger than, but representative of the final 3D printed part, and that includes metal build material particles held or bound together at the printing location with metal connections. The metal build material particles retain their original shapes during the formation of the green part, which helps to assure dimensional control of the fabricated part. This may be due to the fact that the sintering temperature used to form the metal connections is below the sintering and melting temperatures of the build material particles. Moreover, the metal connections reduce the dimensional change experienced by the part, allowing for the production of detailed features. It is to be understood that some shrinkage (e.g., up to about 40 vol % or up to about 15% in each linear direction) of the part precursor disclosed herein may occur during the sintering/densification stage. However, the initial metal connections reduce the amount of mass lost during final sintering, and thus provide greater conformance between the consolidated shape the green part) and a post-sintering shape, when compared to other 3D printing materials that result in shrinkage of the part after sintering (e.g., polymer bound green parts). The mechanical strength of the green part enables the green part to be handled or extracted from a build material platform.

It is to be understood that the term "green" when referring to the green part does not connote color, but rather indicates that the part is not yet fully processed.

It has been found that several printing parameters can affect the formation of the part precursor/green part. Examples of these printing parameters include print temperature, fluid loading, fluid application timing, processing time, build material distributor speed, build material layer height, heating time, and/or heating speed. It has been found that these parameters interplay with one another, and adjusting some of these printing parameters can deleteriously affect others of these printing parameters. For example, the print temperature, the fluid loading, the fluid application timing, and the various heating parameters can all affect fluid splashing and/or fluid bubbling, which can render it difficult to achieve a green part with accuracy and resolution (e.g., small feature definition). The examples disclosed herein balance these parameters to minimize or reduce undesirable effects and achieve a suitable temperature that sinters the metal nanoparticles without pre-sintering the build material particles. As such, the examples disclosed herein enable features down to 200 µm to be printed and retained after final sintering and enables the desired metal connections between the metal build material particles to be formed in the part precursor. The metal connections generate a mechanically strong green part (e.g., breaking strength up to about 20 MPa, and in some instances, up to about 16 MPa), that can be handled.

Referring now to FIG. 1, an example of a three-dimensional (3D) printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

In an example, the three-dimensional (3D) printing system 10 generally includes a supply 14 of a metal build material 16; a build material distributor 18; a supply of a fluid 20 including metal nanoparticles 22; an inkjet applicator 24 for selectively dispensing the fluid 20; a heat source 26, 26'; a controller 28; and a non-transitory computer readable medium having stored thereon computer executable instructions to cause the controller 32 to process data and in response: to control the build material supply 14 and the build material distributor 18 to form a layer of the metal build material particles 16 having a predetermined height; to control a spreading speed of the build material distributor 18; to control the inkjet applicator 24 to selectively apply the fluid 26 at a fluid flux loading that wets the portion through the predetermined height without saturating the portion: and to control the heat source 26, 26' to perform a number of heating events at a predetermined speed and separated by a predetermined delay time. In the example shown in FIG. 1, the printing system 10 also includes a build material surface 12 (also referred to herein as a build area platform), upon which layers 30 of the metal build material are applied and the green part 32 is formed.

The build area platform 12 receives the metal build material particles 16 (described further below in references to FIGS. 2 and 3A-3C) from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

The build area platform 12 may be moved in a direction as denoted by the arrow 34, e.g., along the z-axis, so that metal build material 16 may be delivered to the platform 12 or to a previously formed green part layer (i.e., metal build material particles 16 held together by metal connections 22'). In an example, when the metal build material particles 16 are to be delivered, the build area platform 12 may be programmed to advance (e.g., downward) enough so that the build material distributor 18 can push the build material 16 onto the platform 12 to form a layer of the metal build material particles 16 thereon. The build area platform 12 may also be returned to its original position, for example, when a new green part 32 is to be built.

The build material supply 14 may be a container, bed, or other surface that is to position the metal build material particles 16 between the build material distributor 18 and the build area platform 12. In some examples, the build material supply 14 may include a surface upon which the build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the metal build material particles 16 from a storage location to a position to be spread onto the build area platform 12 or onto a previously formed 3D part layer.

The build material distributor 18 may be moved in a direction as denoted by the arrow 36. e.g., along the y-axis, over the build material supply 14 and across the build area platform 12 to spread a layer of the metal build material 16 particles over the build area platform 12. The build material distributor 18 may also be returned to a position adjacent to the build material supply 14 following the spreading of the metal build material particles 16. The build material distributor 18 may be a blade (e.g., a doctor blade), a roller, a combination of a roller and a blade, and/or any other device capable of spreading the metal build material particles 16 over the build area platform 12. For instance, the build material distributor 18 may be a counter-rotating roller.

As shown in FIG. 1, the printing system 10 also includes an inkjet applicator 24 for selectively dispensing the fluid 20 including the metal nanoparticles 22 (described further below in references to FIGS. 2 and 3A-3C). The inkjet applicator 24 may include nozzles, fluid slots, and/or fluidics for dispensing the fluid 20. The inkjet applicator 24 may be a thermal inkjet printhead or print bar, a piezoelectric printhead or print bar, or a continuous inkjet printhead or print bar. While a single inkjet applicator 24 is shown in FIG. 1, it is to be understood that multiple inkjet applicators 24 may be used.

The inkjet applicator 24 may be scanned across the build area platform 12 in the direction indicated by the arrow 38, e.g., along they-axis. The inkjet applicator 24 may extend a width of the build area platform 12. The inkjet applicator 24 may also be scanned along the x-axis, for instance, in configurations in which the inkjet applicator does not span the width of the build area platform 12 to enable the inkjet applicator 24 to deposit the fluid 20 over a large area of a layer of the metal build material particles 16. The inkjet applicator 24 may thus be attached to a moving XY stage or a translational carriage 40 that moves the inkjet applicator 24 adjacent to the build area platform 12 in order to deposit the fluid 20 in predetermined areas of a layer of the metal build material particles 16 that has been formed on the build area platform 12 in accordance with the method(s) disclosed herein.

As shown in FIG. 1, the printing system 10 may also include the heat source 26, 26'. The heat source 26, 26' may be used to expose the build area platform 12 (and any metal build material particles 16 and/or fluid 20 thereon) to heat that sinters the metal nanoparticles 22 to form metal connections 22'. The heat source 26, 26' may be any suitable heat lamp, examples of which include commercially available infrared (IR) lamps, ultraviolet (UV) lamps, flash lamps, and halogen lamps. Other examples of the heat source 26, 26' may include microwave radiation sources, xenon pulse lamps, IR lasers, etc.

As depicted in FIG. 1, the heat source 26, 26' may be a stationary lamp 26' or a moving lamp 26. The stationary lamp 26' may be in a fixed position relative to the build area platform 12, and may be turned on when heat exposure is desired and off when heat exposure is not desired. The moving lamp(s) 26 can be mounted on a track (e.g., translational carriage 40) to move across the build area platform 12 in a direction as denoted by the arrow 38, e.g., along the y-axis. This allows for printing and heating in a single pass. Such lamps 26 can make multiple passes over the build area platform 12 depending on the amount of exposure utilized in the method(s) disclosed herein. In the example shown in FIG. 1, the lamps 26 are mounted at opposite ends of the inkjet applicator 24 so that heat can be applied to the build material 16 immediately before the fluid 20 is deposited and/or immediately after the fluid 20 is deposited, depending on the movement of the translational carriage 40. In an example, the moving lamp 26 at the left side of the translational carriage may be a leading lamp and the moving lamp 26 at the right side of the translational carriage may be a trailing lamp.

The heat source 26, 26' may irradiate the entire build area platform 12 with a substantially uniform amount of energy. This can selectively sinter the metal nanoparticles 22 in the portions of the metal build material particles 16 patterned with the fluid 20, while leaving the unpatterned portion(s) of the metal build material particles 16 below their melting or softening point (and thus not sintered).

As will be described in more detail below, the fluid 20 may include an absorber. In these examples, the heat source 26, 26' can be a radiation source that is matched with the absorber in the fluid 20 so that the radiation source emits wavelengths of light that match the peak absorption wavelengths of the fluid 20. A fluid 20 with a narrow peak at a particular near-infrared wavelength can be used with a lamp that emits a narrow range of wavelengths at approximately the peak wavelength of the fluid 20. Similarly, a fluid 20 that absorbs a broad range of near-infrared wavelengths can be used with a lamp that emits a broad range of wavelengths. Matching the absorber in the fluid 20 and the radiation source in this way can increase the efficiency of heating the metal nanoparticles 22 and forming the metal connections 22', while the unpatterned metal build material particles 1 particles do not absorb as much radiation and remain at a lower temperature.

The heat source 26, 26' may be operatively connected to a lamp/laser driver, an input/output temperature controller, and temperature sensors, which are collectively shown as heat system components 42. The heat system components 42 may operate together, and with controller 28, to control the heat source 26, 26'. The temperature recipe (e.g., heat exposure rate) may be submitted to the input/output temperature controller. During heating, the temperature sensors may sense the temperature of the build area platform 12, and the temperature measurements may be transmitted to the input/output temperature controller. For example, a thermometer associated with the heated build material surface can provide temperature feedback. The input/output temperature controller may adjust the source 26, 26' power set points based on any difference between the recipe and the real-time measurements. These power set points are sent to the lamp/laser drivers, which transmit appropriate lamp/laser voltages to the heat source 26, 26'. This is one example of the heat system components 42, and it is to be understood that other heat source control systems may be used. For example, the controller 32 may be configured in a similar manner to control the heat source 26, 26'.

Each of these physical elements may be operatively connected to the controller 28 of the printing system 10. The controller 28 may control the operations of the build area platform 12, the build material supply 14, the build material distributor 18, the applicator 24, and the heat source 26, 26'. As an example, the controller 28 may control actuators (not shown) to control various operations of the 3D printing system 10 components. The controller 28 may be a computing device, a semiconductor-based microprocessor, a central processing unit (CPU), an application specific integrated circuit (ASIC), and/or another hardware device.

Although not shown, the controller 28 may be connected to the 3D printing system 10 components via communication lines.

The controller 28 manipulates and transforms data, which may be represented as physical (electronic) quantities within the printer's registers and memories, in order to control the physical elements to create the part precursor/green part 32. As such, the controller 28 is depicted as being in communication with a data store 44. The data store 44 may include data pertaining to a 3D part to be printed by the 3D printing system 10. The data for the selective delivery/application of the metal build material particles 16 (e.g., including a height of the layer to be formed and a spreading speed of the distributor 18) and the fluid 20 (e.g., including a fluid loading and timing for fluid application), and the data for the heating events (e.g., number of heating passes, delay time between heating passes, speed of the heat lamps 26, etc.) may be derived, in part, from a model of the 3D part to be formed. In the examples disclosed herein, the data is also derived from balancing the build material distributor speed, the build material layer height, the print temperature, the fluid loading, the fluid application timing, the heating event delay timing, the heating lamp speed, and the number of heating in order to obtain a mechanically strong green part 32. The data store 44 may include the machine readable instructions (stored on a non-transitory computer readable medium) that are to cause the controller 28 to process the data and in response to control one or more of the physical elements of the printing system 10.

FIG. 1 also illustrates layers 30 of the metal build material particles 16 on the build area platform 12 and the part precursor 32 formed from some of the build material particles 16 in the layers 30. Examples of the 3D printing method disclosed herein, which may be used for forming the part precursor 32, will be described further in reference to FIGS. 2 and 3A-3C.

FIG. 2 is a flow diagram illustrating an example of the method 100. Generally, the method 100 comprises: at a print temperature, forming a layer of metal build material particles, the layer having a predetermined height; and selectively applying a fluid containing metal nanoparticles to at least a portion of the layer, and at a fluid loading that wets the portion through the predetermined height without saturating the portion (as shown at reference numeral 102, and in FIGS. 3A and 3B); exposing the metal nanoparticles to a sintering temperature that is higher than the print temperature and at least 500° below a melting point of the metal build material particles using a predetermined number of heating events taking place at a predetermined speed or for a predetermined time, and separated by a predetermined delay time, thereby binding the metal build material particles together to form a bound layer (as shown at reference numeral 104 and in FIG. 3C); cooling a build material surface to or below the print temperature (as shown at reference numeral 106, and between FIGS. 3C and 3A); and then repeating the forming, the selectively applying, the exposing, and the cooling to form a part precursor (as shown at reference numeral 108, and denoted by the arrow between FIGS. 3C and 3A).

The method 100 involves forming a layer 30 of the metal build material particles 16. This is shown in FIGS. 3A and 3B.

The metal build material particles 16 may be any suitable metal or combinations of metals, that when combined with the metal connections 22' will form a target alloy system for the final 3D part. The target alloy system may have iron, steel, nickel, aluminum, titanium, copper, cobalt, tungsten, or a precious metal (e.g., silver, gold, platinum, or palladium) as the main component. The main component may be selected as all of the build material particles or as a percentage of the build material particles. For example, if the target alloy system is a copper alloy of 60-70% copper brass, the metal build material particles may include suitable percentages of copper and zinc. When the same metal is used as the main component in the build material 16 and as the nanoparticles 22 in the fluid 20, it is to be understood that the percentage of the metal in the build material composition may be adjusted to compensate for the amount of the metal that will be introduced in the form of the metal nanoparticles 22. As an example, to obtain a 3D part with the target alloy system of 60-70% copper brass, a 65% copper metal powder (also including zinc, and in some instances other alloying element(s), such as aluminum, manganese, silicon, phosphorus, arsenic, lead, tin, iron, and/or nickel, which can be present in a total amount of up to about 6%) may be used with a 1% to 5% loading of copper nanoparticles 22. When different metals are used for the build material 16 and the nanoparticles 22 in the fluid 20, a build material that is deficient in the metal of the nanoparticles 22 may be selected, and the nanoparticles 22 may be used to bring the content of that metal within the range of the target alloy. As an example, steel metal powder that includes no nickel may be used with a fluid 20 containing nickel nanoparticles 22, and the fluid loading may be sufficient to approach the specification for nickel within the target steel. When the build material 16 includes the nanoparticle metal as a minor (not the main) component, then the fluid 20 including the nanoparticles 22 may be added in an amount that is sufficient to stay within the specification for nickel within the target steel. As an example, steel metal powder that includes about 14% nickel may be used with a fluid 20 containing nickel nanoparticles 22, and the fluid loading may be sufficient to stay within the specification for nickel (e.g., 14-18%) for the target steel.

Figure 3B:
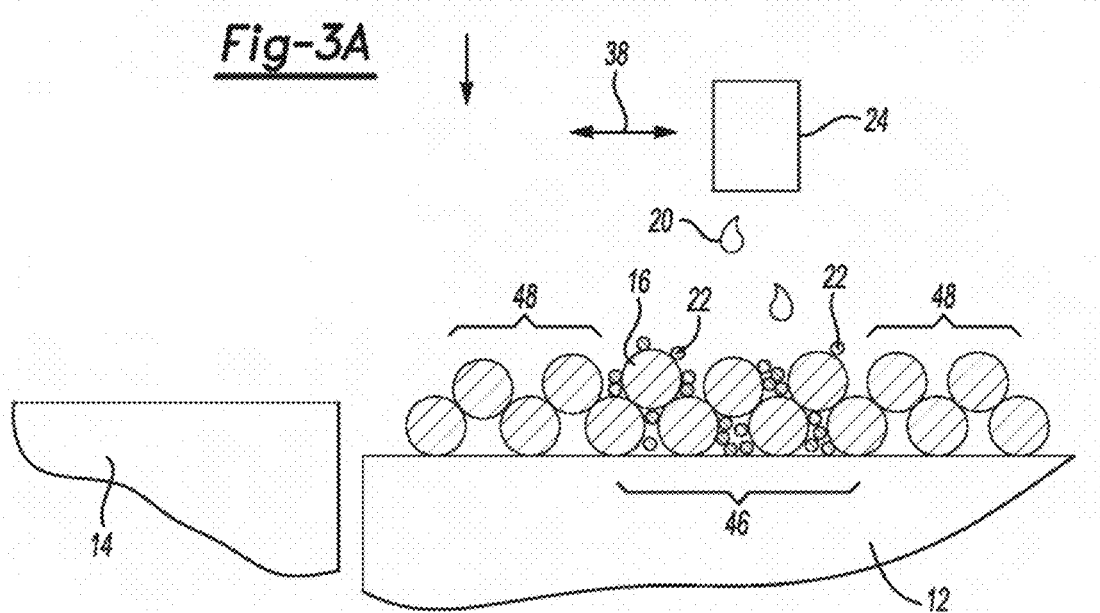
Figure 3C:
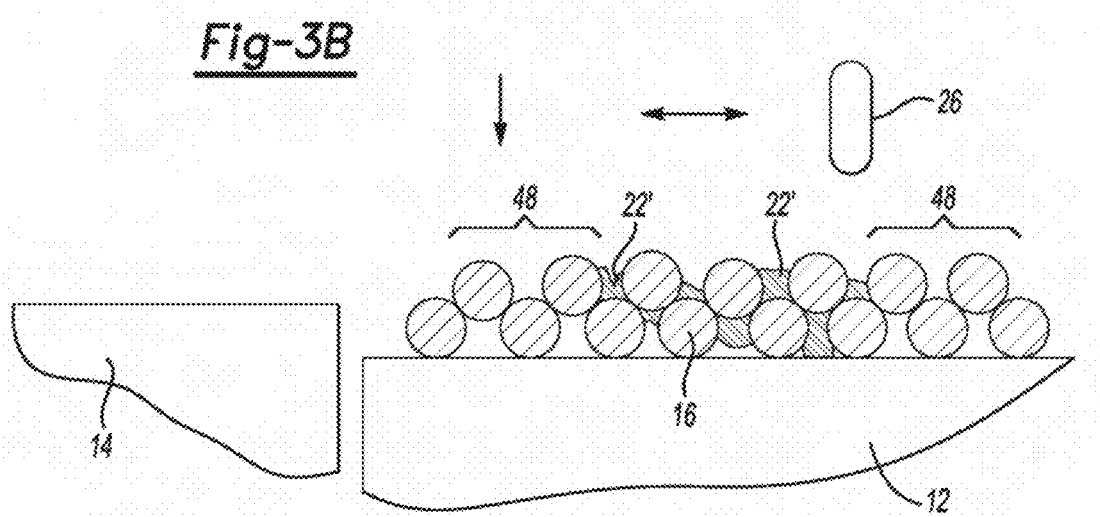

While not shown in FIGS. 3A and 3B, forming the layer 30 of the metal build material particles 16 may involve the build material supply 14 supplying the build material 16 into a position so that they are ready to be spread onto the build area platform 12. The build material distributor 18 may spread the supplied build material 16 directly onto the build area platform 12 (as shown in FIG. 3A), or onto a previously formed/processed layer of the part precursor 32 (the previously formed/processed layer is referred to herein as a "bound layer" and is shown in FIG. 3C). The controller 28 may execute control build material supply instructions to control the build material supply 14 to appropriately position the build material particles 16, and may execute control spreader instructions to control the build material distributor 18 to spread the supplied build material 16 over the build area platform 12 to form the layer 30 of build material 16 thereon. As shown in FIG. 3B, one layer 30 of the build material 16 has been applied or formed.

The build material distributor 18 may be operated at a particular spreading speed throughout the method 100. The spreading speed of the distributor 18 when forming the first layer 30 of the build material particles 16 may be any suitable speed that substantially uniformly distributes the metal build material particles 16.

For forming a subsequent layer 30 on a bound layer 50 (FIG. 3C), the spreading speed of the build material distributor 18 may be selected so that the print process is not disrupted and so that the print time is not prolonged. It has been found that the print process can be interrupted when the bound layer 50 of the part precursor 32 is pushed or pressed upon too much during the formation of a new layer 30 of build material particles. When the layer 30 of metal build material particles 16 is formed and the fluid 20 is selectively applied thereto, the amount of solid material is increased in the patterned portion(s) 46 where the metal nanoparticles 22 are added, and the bulk density of the layer 30 may decrease in these area(s) as a result of rapid fluid evaporation. As such, the patterned portion(s) 46 of the layer 30 may slightly protrude above the unpatterned portion(s) 48 of the layer 30 (see FIG. 3B). Similarly, the bound layer 50 may slightly protrude above the unpatterned portion(s) 48 of the layer 30 surrounding the bound layer 50 (see FIG. 3C) While the slightly protruding portion(s) may aid in adhesion between adjacent bound layers 50, it/they may also be detrimental to the spreading of a new layer 30 of build material particles 16 on the bound layer 50. For example, when a new layer 30 is being formed, the additional build material particles 16 that are being spread may require more force to move over and/or around the slightly protruding portion(s) of the bound layer 50. This force transfers more momentum from the build material particles 16 to the bound layer 50. A slower spreading speed of the build material distributor 18 can reduce the momentum that is transferred from the build material particles 16 to the underlying bound layer 50. Therefore, in the examples disclosed herein, the repeating of the forming of the layer 30 (i.e., the forming of an additional layer 30) involves spreading an additional layer of the build material particles 16 on the bound layer 50 using a spreading speed that prevents movement of the bound layer 50. The spreading speed may also be selected so that the overall print time of a single bound layer 50 is not increased too much. In an example, the spreading speed of the distributor 18 ranges from about 1 inch per second to about 5 inches per second.

The spreading speed of the distributor 18 may be the same for every layer 30 that is formed or may be adjusted from one layer 30 to the next.

In the examples disclosed herein, the overall print time of a single bound layer 50 may range from about 1 second to about 6 minutes seconds, depending upon several factors, including the spreading speed and the heating event conditions. In some examples, the overall print time of a single bound layer 50 may range from about 5 seconds to about 120 seconds, or from about 15 seconds to about 40 seconds. In other examples, the overall print time may be less than 10 seconds, or less than 5 seconds, Faster overall print times may be achieved using examples of the method 100 disclosed herein with an in-line build material distributor 18, inkjet applicator 25, and heat source 26, 26'.

The metal build material particles 16 are spread to a predetermined height H (FIG. 3B). The height H of the first layer may be any suitable height, and is at least as thick as the average diameter of the metal build material particles 16. The predetermined height H of subsequent layers 30 depends, in part, on the speed of the build material distributor 18 used to spread the particles 16. As mentioned above, subsequently applied build material particles 16 can transfer momentum to an immediately adjacent bound layer 50, and slower distributor speeds transfer less momentum. With a smaller layer height H, momentum is more efficiently transferred to the underlying bound layer 50, and with a larger layer height H, momentum is less efficiently transferred. Therefore, in the examples disclosed herein, the predetermined height H of the layer 30 is the smallest height possible, in order to improve z-axis resolution and overall part resolution, which does not cause the underlying bound layer 50 to be pushed and also does not require an extremely slow distributor speed (which can increase the overall printing time). In an example, the predetermined height H ranges from about 10 μm to about 500 μm. As specific examples, the predetermined height H maybe about 30 μm, about 60 μm, or about 100 μm.

The predetermined height H may be consistent from layer 30 to layer 30 as the part precursor 32 is printed, or the predetermined height H may be dynamically adjusted from one layer 30 to the next layer 30 taking into account the distributor spreading speed and overall print time.

The method 100 also involves selectively applying the fluid 20 containing the metal nanoparticles 22 to at least a portion 46 of the layer 30. This is shown in FIG. 3B.

The fluid 20 is a jettable composition that contains the metal nanoparticles 22. The metal nanoparticles 22 used may depend, in part, upon the target alloy system for the 3D part being formed, as well as composition of the build material particles 16. In an example, the nanoparticles are selected from the group consisting of silver, copper, nickel, stainless steel, and cupronickel. Some examples of the target alloy systems (for the formed 3D part) and the main component of the build material particles 16 and the nanoparticles 22 that may be used to obtain these target alloy systems are shown in Table 1.

TABLE 1

| Target Alloy System | Main Component of Build Material | Nanoparticle Materials |
| --- | --- | --- |
| Iron alloy | Iron | Stainless steel, copper, cupronickel, or nickel |
| Steel alloy | Iron | Stainless steel, copper, cupronickel, or nickel |
| Nickel alloy | Nickel | Stainless steel, copper, cupronickel, or nickel |
| Aluminum alloy | Aluminum | Copper |
| Titanium alloy | Titanium | Copper |
| Copper alloy | Copper | Copper, silver, or cupronickel |
| Precious metal alloy | Silver, Gold, Platinum or Palladium | Copper or silver |

While several examples of the nanoparticles 22 have been provided in Table 1, it s to be understood that other metal nanoparticles 22 may be used. Examples include iron, iron alloys aluminium, aluminium alloys, titanium, titanium alloys, chromium, manganese, cobalt, cobalt alloys, nickel alloys, copper alloys, zinc, molybdenum, tin, or combinations of any of these nanoparticles with any of the nanoparticles 22 mentioned herein. It is believed that any other metal may also be used for the nanoparticles 22.

The average particle size, diameter, or other dimension of the nanoparticles 22 may range from about 0.5 nm to about 200 nm.

In an example, the fluid 20 includes the nanoparticles 22 in an amount ranging from about 5 wt % to about 60 wt %.

In addition to the metal nanoparticles 22, the fluid 20 may further include a dispersing agent (i.e., dispersant) to aid in dispersing the nanoparticles 22 throughout the fluid 20. The amount of the dispersant may range from about 0.1 wt % to about 10 wt % based on the total weight percent of the fluid 20. Examples of suitable dispersants include PLURONIC® 123 (symmetric triblock copolymer including polyethylene oxide) (PEO) and poly(propylene oxide) (PPO), from BASF Corp.), BRIJ® series of surfactants (available from Croda, Inc.), IGEPAL® (surfactants derived from octylphenol, available from Rhodia), SURFONYL® series of surfactants (available from Air Products and Chemicals, Inc.), JONCRYL® series of dispersing agents (available from BASF Corp.), TWEEN® series of surfactants (available from Croda, Inc.), and DisperseBYK® series of wetting and dispersing additives (available from BYK).

In addition to the metal nanoparticles 22 (alone or in combination with the dispersant), the fluid 20 may further include a surfactant, a humectant, an anti-kogation agent, an antimicrobial agent, a chelating agent, a solvent, or combinations thereof. In some examples, the fluid 20 is a water-based dispersion, and thus the solvent is water.

Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), an ethylene oxide/propylene oxide block copolymer non-ionic surfactant (e.g., PLURONIC® P 123 from BASF Corp.), a polyoxyethylene stearyl ether non-ionic surfactant (e.g., BRIJ® S 100 from Croda, Inc.), or combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer SURFYNOL® 420 from Air Products and Chemical Inc.). Still other suitable surfactants include non-ionic wetting agents and molecular defoamers (e.g., SURFYNOL® 104 from Air Products and Chemical Inc.) or water-soluble, non-ionic surfactants (e.g., TERGITOL™ TMN-6 from The Dow Chemical Company).

Whether a single surfactant is used or a combination of surfactants is used, the total amount of surfactant(s) in the fluid 20 may range from about 0.1 wt % to about 10 wt % based on the total wt % of the fluid 20. In an example, a combination of surfactants is present in the fluid 20 in an amount ranging from about 2.8 wt % to about 3.8 wt % (based on the total wt % of the fluid 20). In this example, the combination of surfactants may include SURFYNOL® SEF, CAPSTONE® FS-35, and PLURONIC® P 123 or BRIJ® S 100.

Examples of suitable humectants that may be included in the fluid 20 include 1-methyl-2-pyrrolidone, N-2-hydroxyethyl-2-pyrrolidone, 2-pyrrolidinone, diethylene glycol, glycerol, lipoic ethylene glycol, and combinations thereof.

Whether a single humectant is used or a combination of humectants is used, the total amount of humectant(s) in the fluid 20 may range from about 0.25 wt % to about 40 wt % based on the total wt % of the fluid 20. In an example, the humectant(s) is/are present in the fluid 20 in an amount of about 20 wt % (based on the total wt % of the fluid 20).

An anti-kogation agent may also be included in the fluid 20 (e.g., when the fluid 20 is to be used with thermal inkjet printing). Kogation refers to the deposit of dried fluid 20 on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fluid 20 may range from about 0.1 wt % to about 5 wt % based on the total wt % of the fluid 20. In an example, the anti-kogation agent(s) is/are present in the fluid 20 in an amount of about 0.05 wt % (based on the total wt % of the fluid 20).

The fluid 20 may include an antimicrobial agent. Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof.

In an example, the fluid 20 may include a total amount of antimicrobial agent(s) that ranges from about 0.1 wt % to about 1 wt %. In an example, the antimicrobial agent(s) is/are a biocide and is/are present in the fluid 20 in an amount of about 0.32 wt % (based on the total wt % of the fluid 20).

The fluid 20 may also include chelating agent(s). The chelating agent may be included to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fluid 20 may range from 0 wt % to about 2 wt % based on the total wt % of the fluid 20. In an example, the chelating agent(s) is/are present in the fluid 20 in an amount of about 0.04 wt % (based on the total wt % of the fluid 20).

As mentioned above, in an example, the solvent is water. In other examples, the solvent may be isopropanol, isobutanol, pentanol, hexanol, acetone, ethylene glycol, propylene glycol, or a combination of any one of these solvents with water and/or with any other of these solvent(s). The solvent may make up a balance of the fluid 20.

In some examples, the fluid 20 may also include a radiation absorber in order to improve the heating efficiency of the metal nanoparticles 22 applied to the layer 30. An absorber can absorb radiation applied to the layer 30 (i.e., has a favorable absorption spectrum compared with the emission spectrum of the heat source 26, 26'), and can transfer the absorbed energy to nanoparticles 22 within proximity of the absorber. This can heat the nanoparticles 22 faster, enabling them to sinter and form the metal connections 22' faster. In an example, the nanoparticles 22 themselves are an absorber. In another example, the absorber is a non-metal material, such as an organic material, an inorganic material, or a metal salt. As an example, the absorber may be any infrared light absorbing colorant. In an example, the active material is a near-infrared light absorber, such as carbon black. As examples, the amount of the absorber in the fluid 20 ranges from about 0.3 wt % to 30 wt %, or from about 1 wt % to about 20 wt %, or from about 1.0 wt % up to about 10.0 wt %, or from greater than 4.0 wt % up to about 15.0 wt %.

In an example, at least some of the additional components (i.e., surfactant(s), humectant(s), anti-kogation agent(s), antimicrobial agent(s), chelating agent(s), and/or solvent(s), may be mixed together to form a vehicle that is combined with water at a ratio of about 1:1. All or a portion of this combined vehicle may be mixed with the metal nanoparticles 22 and milled to form the fluid 20. In some examples, additional surfactant(s) may be added prior to milling. In an example, milling may be accomplished with a milling material (e.g., zirconia beads. 0.2 mm) in a planetary ball mill. Suitable milling conditions may include from 4 to 6 milling events, where each event takes place for about 6 minutes at about 700 rpm, with about 30 minutes of rest between the milling events.

The fluid 20 is selectively deposited at a fluid loading that wets the portion 46 of the layer 30 through the predetermined height H without saturating the portion 46. Wetting the portion through the layer 30 means that the fluid 20 at least partially penetrates the voids between the build material particles 16 throughout the entire height H, and may even slightly penetrate into an underlying bound layer 50. This helps adjacent layers 50 to interconnect. However, the fluid loading 20 is such that it does not saturate the layer 30. Saturation occurs when the build material particles 1 at the patterned portion 46 become thoroughly soaked with the fluid 20 that no more fluid can be absorbed.

The print temperature may be taken into account when determining the fluid loading. At elevated temperatures, (e.g., at the print temperature, which is above room temperature), there is significant evaporation of at least some of the fluid 20 components. As such, at the printing temperature disclosed herein, the fluid loading may be higher than expected without saturating the build material particles 16.

Loading the fluid 20 to the point of saturation may cause cooling of the build material particles 16, which can make it more difficult to reach the nanoparticle sintering temperature in a desirable time period. Still further, loading the fluid 20 to the point of saturation may cause fluid splashing and/or fluid bubbling. Fluid splashing refers to rapidly volatizing fluid components that cause the remaining fluid component (s) and/or at least some of the build material particles 16 to splatter. This can result in loss of print accuracy and resolution, and can also alter the topology of the layers 30 and 50 (e.g., resulting in a choppy surface with more powder in area(s) and less powder and/or more voids in other area(s)). The altered topology can affect the spreading of a subsequent build material layer 30, which can push the underlying bound layer 50, which can lead to printing interruptions or failure. Fluid bubbling occurs as a result of the vapor space between the build material particles 16 being occupied by the fluid 20. More particularly, when the fluid volatiles go to evaporate, there is no vapor space for them to readily escape from the layer 30. As a result, the evaporating gas forms bubbles, which rise to the surface of the layer 30 and create a poor surface topology (which may interfere with the build material distributor 18 as previously discussed herein).

As such, the fluid loading in the examples disclosed herein may be the lowest possible amount of fluid 20 that still allows for penetration throughout the height H of the layer 30. In an example, the fluid loading may range from about 250 contone to about 1500 contone (which refers to the number of drops, which is divided by 256, that will be placed on average onto each pixel). In another example, the fluid loading may range from about 750 contone to about 1000 contone (which refers to the number of drops, which is divided by 256, that will be placed on average onto each pixel).

The fluid loading will also determine the amount of metal connections 22' that are formed within the part precursor 32 and the final 3D metal part. As previously described, the nanoparticles 22 may be selected so that they alloy well with the metal build material particles 16 in order to obtain a target alloy system, Phase diagrams may be used to determine whether the nanoparticles 22 will alloy well with the metal build material particles 16. As an example, 8 wt % of silver is soluble in copper without creating a secondary phase, and thus the loading of a silver nanoparticle-containing fluid 20 may be selected to introduce about 7 wt % of silver within the final 3D metal part.

In the examples of the method 100 disclosed herein, the timing, of the fluid 20 application is also considered. Fluid loading, fluid splashing, and fluid bubbling may affect, or be affected by, the timing of the fluid 20 application. When the selective application of the fluid 20 is separated into multiple events (e.g., with delay time between the applications/events), adhesion between the bound layers 50 may be reduced because evaporation of volatile components begins as soon as the fluid hits the build material particles 16 on the hot build material surface 12. Separation of the application of the fluid 20 may also cause less of the fluid 20 to penetrate the layer 30 compared to the penetration that is achieved with the fluid application is performed in a single application. There is a higher chance of fluid splashing and bubbling when the fluid 20 is applied in a single application, however, fluid splashing and bubbling may be minimized through the fluid loading and the print temperature. In an example, the selectively applying of the fluid 20 takes place during a single application. It is believed that multiple applications may be used if the timing is such that the desirable loading as described herein can be achieved.

As mentioned above, the forming of the layer 30 and the selectively applying of the fluid 20 take place at a print temperature. In the examples disclosed herein, the print temperature depends, in part, upon the sintering temperature for the metal nanoparticles 22, the minimization of fluid splashing (previously described herein), and the overall print time.

Higher print temperatures can lead to more fluid splashing. Thus, to minimize fluid splashing, a lower print temperature is better.

However, a higher print temperature may be desirable because reaching the elevated temperature for nanoparticle 22 sintering is easier when the print temperature is higher. Moreover, a higher print temperature may be desirable because cooling the build material surface 12 back to the print temperature after sintering the nanoparticles 22 will be a shorter process when the print temperature is higher. Sintering the nanoparticles 22 raises the build material surface 12 (and the printed layer) well above the print temperature, and forming a new layer 30 and selectively applying the fluid 20 cannot successfully be performed at the sintering temperature. As such, the build material surface 12 is allowed to cool (e.g., via thermal processes such as radiation conduction, convection, etc.) down to the print temperature prior to printing another layer 50. When a higher print temperature is selected, this cooling process is quicker, and thus does not prolong the print time.

As such, in the examples disclosed herein, selecting the print temperature may be to at least substantially avoid fluid splashing and to reduce a time for the build material surface 12 to cool to or below the print temperature. In an example, it may be desirable to select the highest print temperature that does not cause any, or minimal, fluid splashing. In an example, the print temperature ranges from about 100° C. to about 200° C.

The method 100 also involves exposing the metal nanoparticles 22 to a sintering temperature that is higher than the print temperature and at least 500° below a melting point of the metal build material particles 16. In the examples disclosed herein, exposure to the sintering temperature involves a predetermined number of heating events taking place at a predetermined speed and separated by a predetermined delay time. The conditions for sintering are sufficient to sinter the nanoparticles 22, which form metal connections 22' that bind the metal build material particles 16 together to form the bound layer 50. This is shown in FIG. 3C.

Heating to a temperature that is greater than the print temperature and at least 500° below the melting point of the metal build material particles 16 ensures that nanoparticle 22 sintering will occur and also ensures that no appreciable sintering of the build material particles 16 will occur. In an example, the sintering temperature ranges from greater than the print temperature to at least 650° below the melting point of the metal build material particles 16.

When heating to sinter the nanoparticles 22, a very large temperature increase from the print temperature to the sintering temperature takes place in a relatively short time period. Several heating events may be used to manage thermal distribution throughout the process. It has been found that if no or little delay between the heating events is incorporated, then fluid bubbling can occur from the rapid volatilization of fluid components. As such, in the examples disclosed herein, a delay may be incorporated between heating events. The delay time between heating events may be based upon the sintering temperature that is to be obtained, the minimization of fluid splashing and/or fluid bubbling, the avoidance of build material oxidation, and/or the overall print time.

Longer delay times allow for the heat from an immediately adjacent bound layer 50 to heat up the current layer 30 of build material particles 16. In some examples, the metal nanoparticles 22 may have preferential absorption of the heat source 26, 26' energy compared to the build material particles 16, so the bound layer 50 (formed at the patterned region(s) 46) are hotter than the unpatterned region(s) 48 and can be used to heat the subsequent layer 30 from below. Furthermore, when selective fluid application is performed, a drop in temperature may occur as the fluid 20 is far below the build material surface 12 temperature and evaporative cooling may occur during fluid component volatilization. As such, a longer delay time between heating events may allow time for heat to transfer from the underlying bound layer 50. The more the bound layer 50 heating mechanism is utilized, the easier it is to get to the sintering temperature without having to rely too heavily upon the heat source 26, 26'.

Rapid heating of the build material particles 16 can contribute to their oxidation. Oxidation is a function of time, temperature, atmosphere, and the composition of the metal build material particles 16. Reducing the number of heating events (e.g., by relying more on, the bound layer 50 heating mechanism, and thus increasing the delay time) may assist in keeping the build material particles 16 from oxidizing. In the examples disclosed herein, copper or steel build material particles 16 may be printed in ambient conditions (i.e., air) without noticeable oxidation when the print temperature and the sintering temperature of the nanoparticles 22 is below about 275° C., which can be achieved, in part, by incorporating a suitable delay time between heating events. Noble metal nanoparticles 22 may have a higher on-set temperature for oxidation in air, while other metal build material particles 16 may have a lower on-set temperature for oxidation in air, To eliminate the oxidation issue, some examples involve performing the method in an inert environment.

As such, examples of the method disclosed herein may involve identifying the predetermined delay time in order to at least substantially avoid fluid bubbling during the exposing, and at least substantially avoid oxidation of the metal build material particles 16 during the exposing.

It is to be understood that while longer delay times are desirable for a number of reasons, they do increase the overall print time. As such, in some instances, the minimum delay time may be used which does not cause bubbling and does not result in too heavy a reliance upon the heat source 26, 26', which can cause too high of a build material surface 12 temperature and cause oxidation of the build material particles, yet still allows for the sintering temperature to be reached. In an example, the predetermined time delay ranges from about 5 seconds to about 10 seconds.

When heating to sinter the nanoparticles 22, the heating speed and the number of heating events are also controlled. Both heating speed and the number of heating events can affect or be affected by the fluid loading, the sintering temperature that is to be obtained, the avoidance of print process interruptions, the minimization of fluid splashing and/or fluid bubbling, the avoidance of build material oxidation, and/or the overall print time.

When a higher fluid loading is selectively applied, the temperature of the patterned build material particles 16 (e.g., in portion 46) is lowered. In these instances, a slower heating speed (for the movable heat source 26) may be desirable to reach the sintering temperature. However, if too slow of a heating speed is utilized, the printing system 10 may fail as a result of overheating components. Moreover, if too slow of a heating speed is utilized, then extremely rapid fluid volatilization may occur, which can cause fluid bubbling. Still further, if too slow of a heating speed is utilized, then the build material particles 16 can overheat, which can lead to oxidation. Finally, if too slow of a heating speed is utilized, then the overall print time is increased. When a fixed heat source 26' is used, the heating speed may not be an issue, but the time of heating exposure may be adjusted in order to reach the sintering temperature, avoid overheating of the printer components, avoid fluid bubbling, and avoid build material particle 16 oxidation. In an example, when a fixed heat source 26' is utilized, the heating time may range from about 3 minutes to about 5 minutes.

The number of heating events can also be controlled. In addition to the parameters/conditions noted herein, the number of heating events may also depend upon the type of heat source 26, 26' that is utilized. When attached to a carriage 40, the number of passes of the heat source 26 over the layer 30 may be controlled, and if multiple sources 26 are connected to the carriage 40, whether the source 26 is turned on or off may also be controlled. For example, during one carriage pass, one heat source 26 may be turned on, and in another carriage pass, several heat sources 26 may be turned on. When the source 26' is used, the on and off cycles of the source 26' may be controlled.

More heating events results in a higher temperature, making the sintering temperature easier to get to. The number of heating events may be balanced with the heating speed or the heating time in order to heat to the sintering temperature as fast as possible given the fluid loading that is being used.

In some examples, the heat source 26, 26' can irradiate each layer 30 of build material from about 0.025 seconds (25 milliseconds) to about 1 second per heating event. This time range may be suitable, for example, when the carriage pass speed ranges from about 0.8 inches per second to about 10 inches per second or from about 0.8 inches per second to about 10 inches per second, and the heat source 26 ranges from about 1 inch to about 4 inches in length. In other examples when a lower power lamp is used, the heating event time may be up to 10 seconds. In still other examples when a higher power lamp is used, the heating event time may be down to 1 microsecond.

In an example, the predetermined number of heating events ranges from 1 to 8, the predetermined speed ranges from about 0.8 inches per second (ips) to about 10 ips, and the predetermined delay time ranges from about 5 seconds to about 10 seconds.

It is to be understood that the predetermined number of heating events, speed, and delay time may be identified prior to printing, taking into account the nanoparticles 22 and build material particles 16 being used, the height H of the layer(s), the fluid loading, the print time, the print temperature, and other applicable printing parameters and conditions. However, the predetermined number of heating events, speed, and/or delay time may be identified and/or adjusted in real time during the print process, in response to temperature sensor feedback from the heated build material surface 12. For example, if the first heating event does not heat the layer 30 enough to initiate nanoparticle sintering, the controller 28 and/or heat system components 42 may reduce the delay time, incorporate an additional lamp pass, reduce the speed of the heat source 26', and/or the like in order to achieve nanoparticle sintering.

After the bound layer 50 shown in FIG. 3C is formed, the method involves cooling the build material surface 12 to or below the print temperature, and then repeating at least reference numerals 102, 104 and 106 of the method 100 to form another bound layer 50 and to build up a part precursor 32.

In one example, the cooling may be passive cooling. The mechanism for passive cooling may be thermal radiation escaping from the bound layer 50, convection to the surrounding environment, and/or conduction into cooler portions of the bound layer 50. When the layer 50 is not the first layer of the part precursor 32 (i.e., the bottom most layer of the part being formed), the mechanism for passive cooling may additionally include conduction into cooler, previously bound layers below the layer 50. Passive cooling involves the system 10 waiting to perform the next printing pass until the temperature of layer 50 or build material surface 12 reaches the print temperature. The system 10 may include a temperature sensor, thermal imaging camera, thermocouple, etc. to determine when the print temperature is reached. The timing for passive cooling may be different following different heating events, depending, in part upon the sintering temperature that is obtained.

Examples of the method 100 disclosed herein may further include receiving a feedback temperature during the forming, the selectively applying, the exposing, and the cooling; and utilizing the feedback temperature to dynamically determine a subsequent print action. The feedback temperature may be a single temperature readout or a temperature range readout (e.g., from an infrared (IR) sensor at or near the build material surface 12) of the temperature at the top of the build material surface 12 or of the build material particles 16 on the build material surface. Taken alone or along with the other factor(s) disclosed herein, the feedback temperature may be considered by the printing system 10 when determining what action to perform next. This can keep the printing system 10 from moving on, e.g., from fusing prematurely or from prematurely applying the next layer of build material particles 16. As examples, the feedback temperature can be used by the printing system 10 to make a determination to selectively apply the fluid 20 and then initiate heat exposure in a single pass, or to perform another heating event in order to achieve the sintering temperature (e.g., because the feedback temperature is still below the sintering temperature window), or to incorporate a longer delay time (e.g., because the feedback temperature is close to the sintering temperature window), or to roll out the next layer of build material particles (e.g., because the feedback temperature is at or below the print temperature).

After the part precursor 32 is formed, if desired, a high temperature sintering process can, be performed to enhance adhesion between the build material particles 16 and to form the 3D part. The high temperature sintering process may also or alternatively be performed to consolidate some of the empty volume in the part precursor 32. As such, some examples of the method 100 further include sintering the part precursor 32 at a temperature greater than 400° C.

In some examples, prior to high temperature sintering, the part precursor 32 may be removed from the build material surface 12 and any unbound build material particles 16 (e.g., from unpatterned portions 48) may be brushed off or otherwise removed. In other examples, high temperature sintering of the part precursor 32 may take place on the build material surface 12 without any unbound build material particles 16 being removed.

Prior to forming the examples of the method 100 disclosed herein, some pre-conditions may be taken into consideration. One is a temperature threshold for forming a mechanically strong part precursor 32, and the other is the emissivity of the metal build material particles 16.

The temperature threshold for sintering the patterned portion 46 of the layer 30 is almost completely determined by the specific nanoparticles 22 in the fluid 20. The sintering temperature may be first approximated by a suitable process, such as hotplate testing, to determine at what temperature the part precursor 32 will begin to have a sufficiently high strength (i.e., around 2 MPa or greater breaking strength). For example, the target build material particles 16 and the target nanoparticles 22 may be mixed to form a paste, which is then placed onto a glass slide and onto a hotplate. As the temperature is slowly elevated (e.g., at a rate of about 20° C./min), the continuity of the paste is tested (e.g., with tweezers). Once the paste beings to form into a rigid hard object, the temperature may be noted, and this temperature may be used as the initial target sintering temperature. Adjustments to the sintering temperature may be made using the printing system 10.

Two relevant temperatures may be involved in the sintering of metal nanoparticles 22. Some nanoparticles 22 may form metal connections 22' that provide a very strong green part (e.g., up to 16 MPa or, in some instances, even higher) after the nanoparticles 22 are fully sintered, which may take place at a very high temperature (400° C. or more). This temperature may be an undesirable sintering temperature, due in part, to fluid splashing, fluid bubbling, build material oxidation, etc. as described herein. With these types of nanoparticles 22, the examples disclosed herein may utilize lower sintering temperatures to partially sinter the metal nanoparticles 22. This can result in a part precursor 32 which has a sufficient strength (e.g., around 2 MPa) for handling. This part precursor 32 may be removed from the build material surface 12 and may be exposed to a secondary low temperature sintering process (which may be higher than the sintering process taking place on the build material surface 12). The secondary low temperature sintering process can fully sinter the nanoparticles 22 without causing any sintering of the build material particles 16 in the part precursor 32. This two-step low sintering process forms a stronger part precursor 32 (e.g., up to 16 MPa or, in some instances, even higher) without risking overheating of the build material particles 16 prematurely.

The emissivity of the metal build material particles 16 may be determined prior to performing the method 100 in order to input meaningful temperatures into the print program and read-out meaningful temperatures from the heat system components 42 (e.g., thermal camera). The emissivity may be determined by spreading a thin (~5 mm) layer of the metal build material particles 16 onto the build material surface 12 and using a heater to heat the particles 16 from underneath. A calibrated thermocouple may be inserted into the metal build material particles 16 to determine the true temperature. A range of temperatures may be created using the build material surface heater, and the emissivity required for the camera to read-out the correct temperature may be recorded at each temperature in the range. Recording data across a range of temperatures enables the emissivity for any given build material to be determined. A correlation between the temperature read-out and the real temperature can be made by fitting the recorded data to a line. Using this fit, a target temperature (true temperature) can be input into the printing system 10 by referring to the derived temperature correlation equation.

One specific example of the method 100 disclosed herein utilizes a copper build material (where the main component is copper particles) and a fluid including silver nanoparticles. This example of the method 100 involves the following: at a print temperature ranging from about 155° C. to about 175° C., forming a layer of copper build material particles, the layer having a height ranging from about 50 μm to about 110 μm and selectively applying a fluid containing silver nanoparticles to at least a portion of the layer, and at a fluid loading that wets the portion through the height without saturating the portion; exposing the silver nanoparticles to a sintering temperature that is higher than the print temperature and at least 500 below a melting point of the copper build material particles using from 5 to 7 heating events taking place i) at a speed ranging from about 4 ips to about 8 ips, ii) for a time ranging from about 90 seconds to about 5 minutes, or iii) a combination of i and ii, and separated by a delay time ranging from about 5 seconds to about 10 seconds, thereby binding the copper build material particles together to form a bound layer; cooling a build material surface to or below the print temperature; and then repeating the forming, the selectively applying, the exposing, and the cooling to form a metal part precursor.

To further illustrate the present disclosure, examples are given herein. It is to be understood that these examples are provided for illustrative purposes and are not to be construed as limiting the scope of the present disclosure.

EXAMPLES

Example 1

In this example, the emissivity of copper build material particles (50 μm powder from Goodfellow) was determined prior to performing any 3D printing. A thin (~5 mm) layer of the copper build material particles was spread onto a build material bed of a test printer. A calibrated thermocouple was inserted into the copper build material particles to determine the true temperature. The copper build material particles were heated at a range of different build material bed temperatures by controlling the temperature of the build bed base plate, which heated the thin (<5 mm) layer of copper powder on top of it to temperatures ranging between about 60° C. and about 140° C. The print program (or control) temperature (as determined by IR sensors installed on the printer) was recorded within this range of temperatures. The emissivity for a forward looking infrared camera (FLIR camera) to read-out the correct temperature was recorded at each temperature in the range. An average emissivity was taken over the temperature range, yielding an emissivity of 0.342 for the copper powder. The true temperature of the build material, the print control temperature, and the emissivity data are shown in Table 2.

TABLE 2

| Reading | Actual Temp. (° C.) | Print Control Temp. (° C.) | Emissivity |
|---|---|---|---|
| 1 | 66.5 | 37.8 | 0.345 |
| 2 | 74 | 41.6 | 0.352 |
| 3 | 84 | 45.5 | 0.352 |
| 4 | 91 | 48.9 | 0.352 |
| 5 | 94.5 | 51 | 0.365 |
| 6 | 106 | 65.7 | 0.34 |
| 7 | 115 | 59.7 | 0.335 |
| 8 | 124.5 | 60.3 | 0.315 |
| 9 | 133.3 | 64.5 | 0.325 |
| 10 | 142 | 68.6 | 0.33 |

Figure 4:
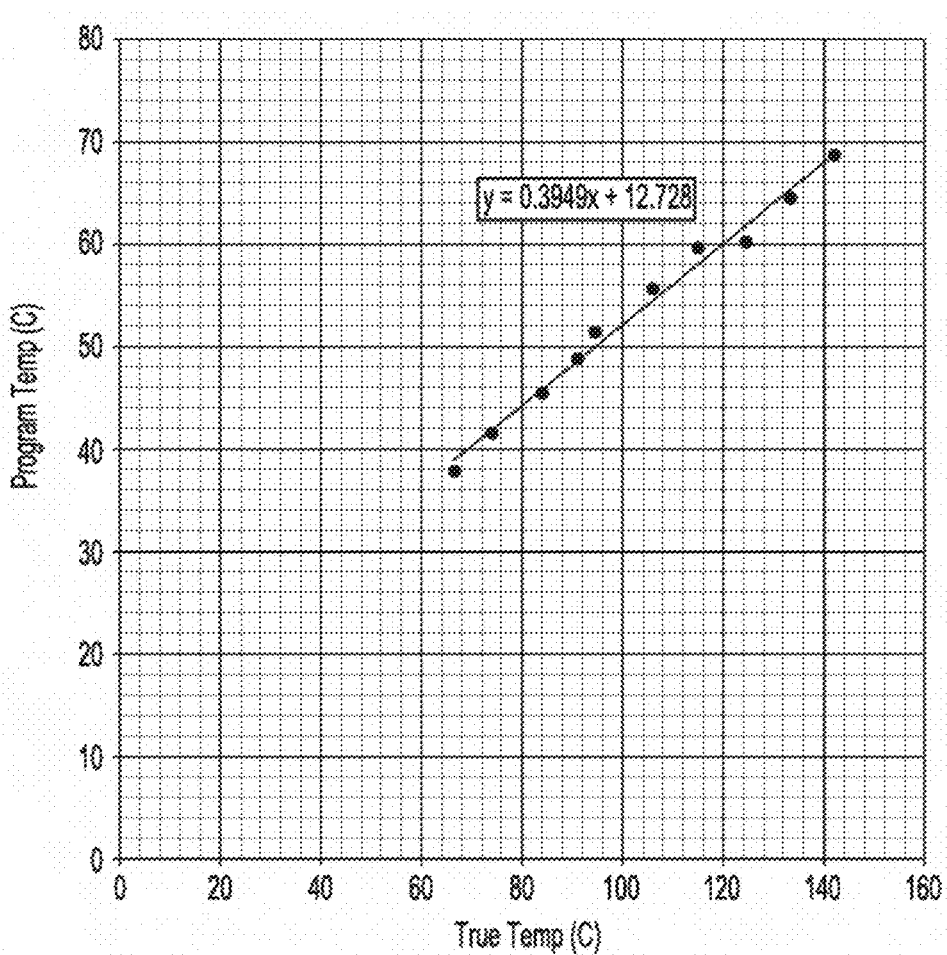
FIG. 4 is a graph depicting the program temperature for a build material bed of a test printer (Y-axis, in ° C.) versus a true temperature of a copper build material heated on the build material bed (X-axis, in ° C.), and also depicting the derived temperature correlation equation for the copper build material.

FIG. 4 depicts the correlation between the temperature read-out and the real temperature, which was made by fitting the recorded data to a line. Using this fit, the target temperature (true temperature) can be input into the printing system 10 by referring to the derived temperature correlation equation (an example of which is shown in FIG. 4).

Example 2

In this example, several print pads were tested with different fluid levels. The fluid included 76 wt % Novacentrix JS-B 40G silver metal nanoparticle ink and 24 wt % of a vehicle including: 40 wt % 2-pyrrolidinone, 1 wt % CRODAFOS™ O3A. 1.5 wt % SURFYNOL® SEF, 0.1 wt % CAPSTONE® FS-35, 0.02 wt % CARBOSPERSE™ K-7028, 0.08 wt % TRILON® M, 0.36 wt % PROXEL® GXL, 0.28 wt % KORDEK™ MLX, and a balance of deionized water. The metal build material particles were a 50 μm copper powder from Goodfellow. The target temperature threshold for the sintering temperature was set at 240° C. Some of the printing parameters are set forth in Table 3.

TABLE 3

| Pad # | Distributor Speed (ips) | Layer Height (μm) | Print Temp. (° C.) | Fluid Loading (contone level) | Fluid Timing | Delay Time (s) |
|---|---|---|---|---|---|---|
| 1 | 1 | 60 | 172 | 1750 | Single application | 10 |
| 2 | 1 | 60 | 172 | 1500 | Single application | 10 |
| 3 | 1 | 60 | 172 | 1250 | Single application | 10 |
| 4 | 1 | 60 | 172 | 1000 | Single application | 10 |
| 5 | 1 | 60 | 172 | 750 | Single application | 10 |
| 6 | 1 | 60 | 172 | 500 | Single application | 10 |
| 7 | 1 | 60 | 172 | 250 | Single application | 10 |
| 8 | 1 | 60 | 172 | 125 | Single application | 10 |

After the layer of powder was applied and the fluid applied via a thermal inkjet printer at the contone level noted in Table 3, each patterned powder layer was exposed to 4 heating events, with the delay times noted in Table 3 spacing out the heating events. The heating events were the same for each of the pads printed, and the heating event conditions are set forth in Table 4.

TABLE 4

| Heating Event # | # Heat Lamps ON | Heating Speed (ips) |
|---|---|---|
| 1 | 1 | 5 |
| 2 | 2 | 4 |
| 3 | 2 | 5 |
| 4 | 2 | 5 |

Several layers were built up using these printing parameters to form part precursors.

Figure 5:
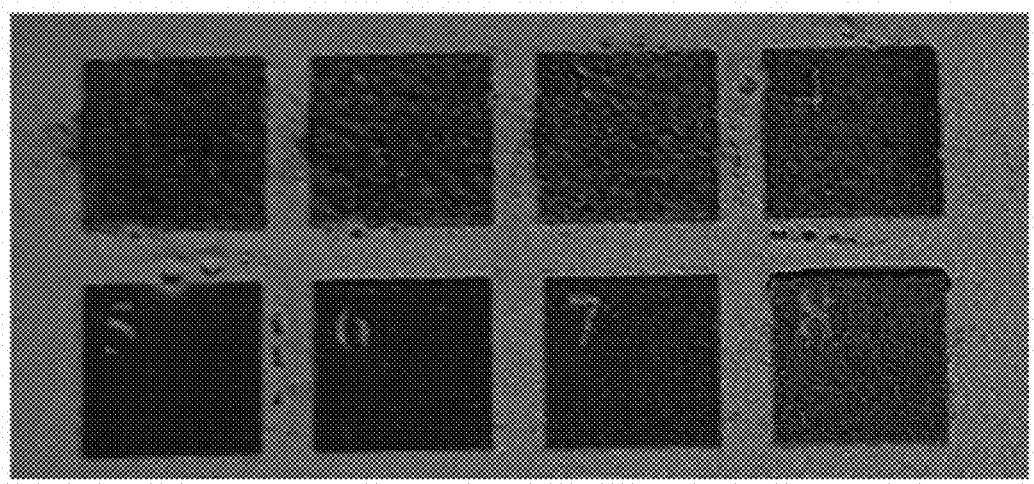
FIG. 5 is a black and white representation of an originally colored photograph of printed pads (part precursors) at different contone levels.

The part precursors are shown in FIG. 5. As depicted, the part precursors printed with fluid contone levels greater than 1000 (i.e., numbers 1-3) experienced fluid splashing, resulting in poor resolution and a rough surface topology, the latter of which impeded the distributor for spreading the next powder layer.

Figure 6:
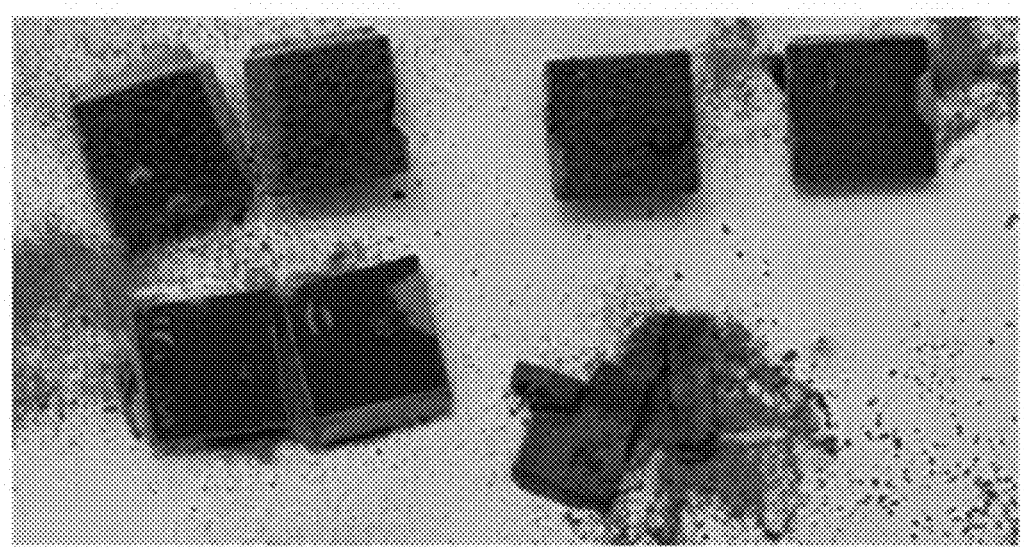
FIG. 6 is a black and white representation of an originally colored photograph of the printed pads of FIG. 5 after strength testing.

The part precursors were also qualitatively tested for green part strength. The pads were broken with tweezers. The strength tested part precursors are shown in FIG. 6. As depicted, the part precursors printed with fluid contone levels less than 500 (La, numbers 7-8) were weak and destroyed as a result of the strength test. Part #6 printed at contone level 500 was intact, but was not as strong as the part printed at contone level of 750 or more. The 500 contone level may be suitable for forming strong part precursors with a different set of heating conditions.

For this set of silver nanoparticle fluid and copper build material particles, strong mechanical parts with a desirable print resolution and surface topology can be obtained at a suitable contone level may range from about 750 to about 1000.

Using the identified contone level of 1000, several other part precursors (#9-13) were printed with the same fluid and build material particles. Some of the other printing parameters were slightly adjusted in order to further minimize fluid splashing, as shown in Table 5. Four heating events with the conditions set forth in Table 3 were used for part precursors #9-13.

TABLE 5

| Pad # | Distributor Speed (ips) | Layer Height (μm) | Print Temp. (° C.) | Fluid Loading (contone level) | Fluid Timing | Delay Time (s) |
|---|---|---|---|---|---|---|
| 9-13 | 0.8 | 100 | 166 | 1000 | Single application | 8 |

Figure 7:
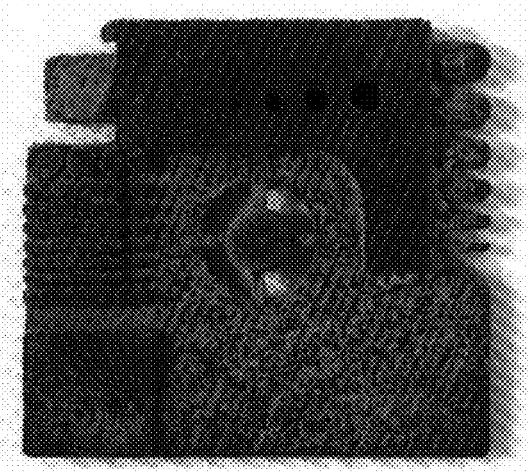
FIG. 7 is a black and white representation of an originally colored photograph of a printed part precursor after primary and secondary low temperature sintering.

After printing, part precursors #9-13 were strong enough to be extracted from the build material surface and were moved into a glovebox (with an inert environment) for a secondary low temperature sintering process. The secondary low temperature sintering process was performed at 300° C. for 30 minutes. The secondary low temperature sintering process fully sintered the silver nanoparticles to achieve stronger part precursors/green parts (one example of which is shown in FIG. 7).

Figure 8A:
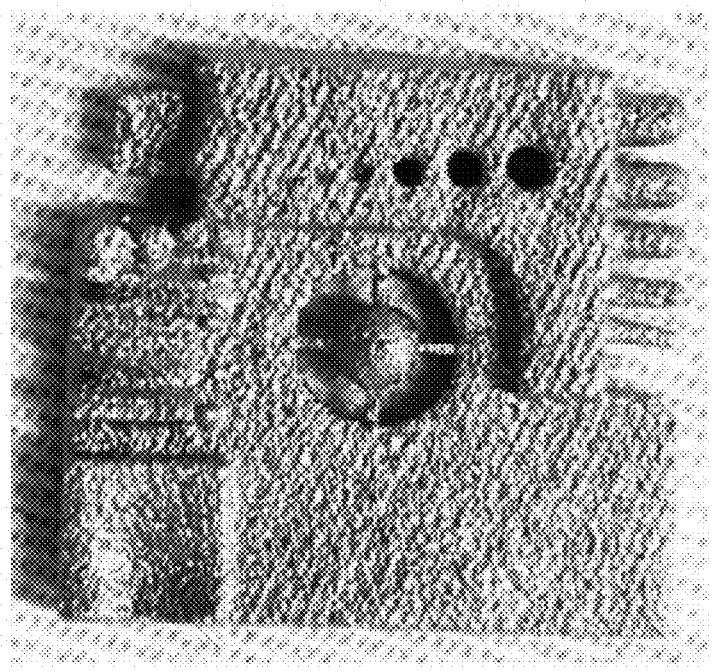
FIGS. 8A through 8C are is a black and white representations of 3D metal parts formed using an example of the method disclosed herein.
Figure 8B:
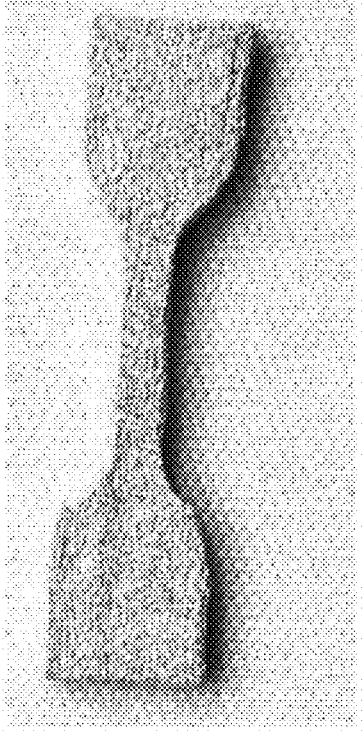
Figure 8C:

Following removal from the glovebox, part precursors #9-11 were exposed to final high temperature sintering to form 3D metal parts, which are shown in FIGS. 8A-8C. The sintering schedule for part precursor 11 (which had the highest density of the three parts) was: increase from room temperature to 500° C. over 30 minutes, increase from 500° C. to 1000° C. over 1000 minutes, and hold at 1000° C. for 400 minutes. This was all done at 300 Torr of forming gas (4% H$_2$ in N$_2$) following tube evacuation prior to the run. No flow of gas was done during the run. The parts were further cleaned. These parts were able to be air-blown, sonicated or even sand-blasted to remove stuck-on copper metal powder. No thermal bleed effect was observed, so the parts had extremely good feature resolution and replication from the .stl file from which the parts were created. When sintered to high density, features down to 200 microns were maintained. Part 9 (FIG. 8A) was 80% dense, part 10 (FIG. 8B) was 94.6% dense, and part 11 (FIG. 8C) was 96.4% dense.

Part precursors #12 and 13 (which had the same geometry as part precursor 11) were not exposed to high temperature sintering. Rather, following removal from the glovebox, part precursors #12 and 13 were exposed to quantitative strength tests. 3 point bend tests were performed for part precursors 12 and 13 to determine the breaking strength. Of the 2 part precursors tested, a 9.0 and 16.1 MPa breaking strength resulted.

Figure 9:
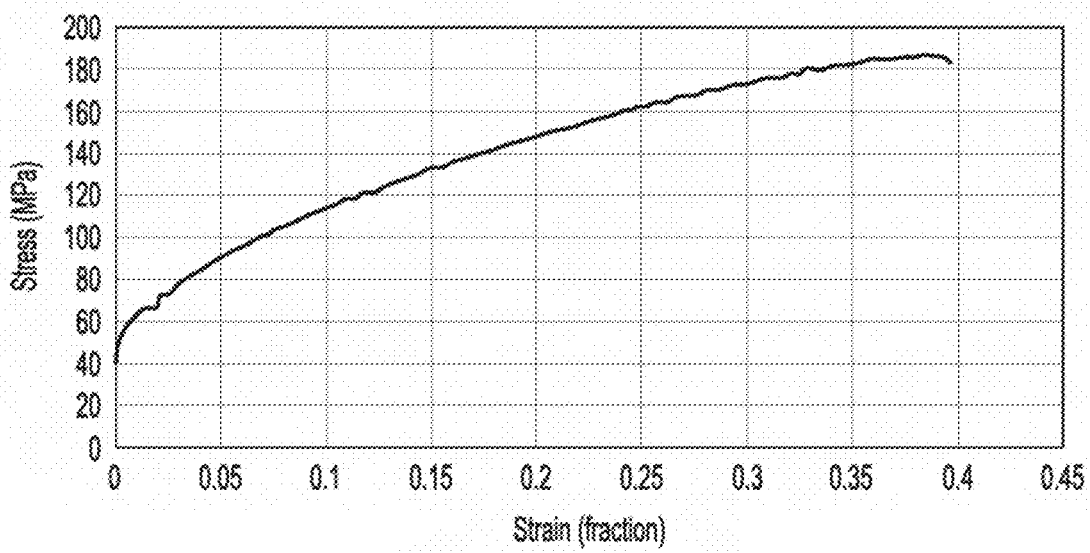
FIG. 9 is a graph of stress (Y-axis, in MPa) versus strain (X-axis, fraction) for the 3D metal part shown in FIG. 8B.

Tensile testing was performed on part #10, a high density dogbone (94.6% dense). The dogbone was tested as sintered, with no milling done to remove surface defects around the necking area. The results are shown in FIG. 9, with an ultimate tensile strength of 187 MPa (85% of bulk. Cu) and an elongation at break of 40% (67% of bulk Cu), The final part contained about 7 wt. % silver.

Example 3

In this example, several print pads were also tested with different fluid levels. The fluid was Novacentrix A101 silver metal nanoparticle ink. The metal build material particles were a 50 µm copper powder from Goodfellow. The target temperature threshold for the sintering temperature was set at 160° C., so the printing parameters were adjusted from Example 2 to meet the lower sintering temperature. Some of the printing parameters are set forth in Table 6.

TABLE 6

| Pad # | Distributor Speed (ips) | Layer Height (µm) | Print Temp. (° C.) | Fluid Loading (contone level) | Fluid Timing | Delay Time (s) |
|---|---|---|---|---|---|---|
| 12 | 1 | 100 | 112 | 250 | Single application | 5 |
| 13 | 1 | 100 | 112 | 500 | Single application | 5 |
| 14 | 1 | 100 | 112 | 750 | Single application | 5 |
| 15 | 1 | 100 | 112 | 1000 | Single application | 5 |
| 16 | 1 | 100 | 112 | 1250 | Single application | 5 |
| 17 | 1 | 100 | 112 | 1500 | Single application | 5 |

After the layer of powder was applied and the fluid applied via a thermal inkjet printer at the contone level noted in Table 6, each patterned powder layer was exposed to 4 heating events, with the delay times noted in Table 6 spacing out the heating events. The heating events were the same for each of the pads printed, and the heating event conditions are set forth in Table 7.

TABLE 7

| Heating Event # | # Heat Lamps ON | Heating Speed (ips) |
|---|---|---|
| 1 | 1 | 8 |
| 2 | 1 | 8 |
| 3 | 2 | 8 |
| 4 | 1 | 8 |

Several layers were built up using these printing parameters to form part precursors.

Figure 10:
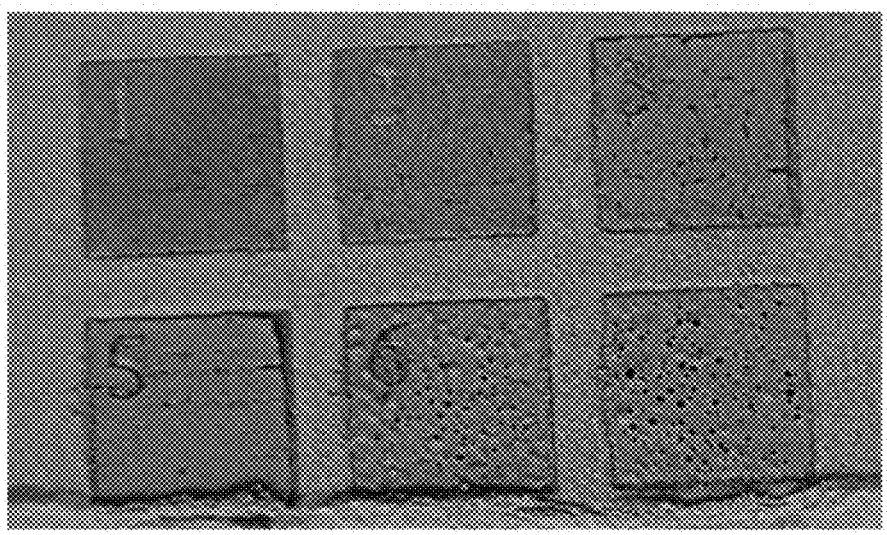
FIG. 10 is black and white representation of an originally colored photograph of printed pads (part precursors) at different contone levels.

The part precursors are shown in FIG. 10. As depicted, the part precursors printed with fluid contone levels greater than 1000 (i.e., numbers 16-17) experienced fluid bubbling, resulting in poor resolution and a rough surface topology, the latter of which impeded the distributor for spreading the next powder layer.

Figure 11:
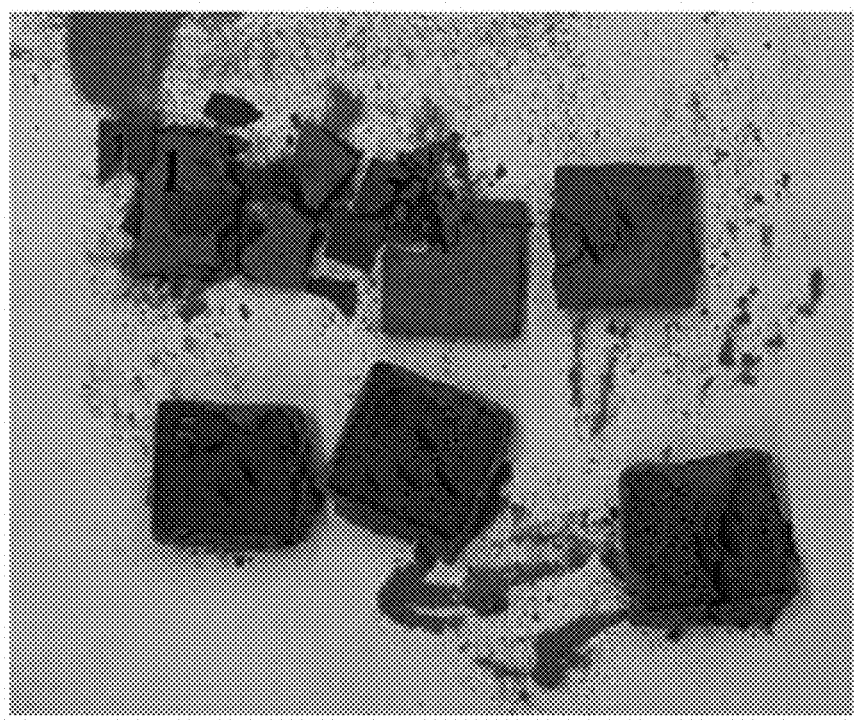
FIG. 11 is a black and white representation of an originally colored photograph of the printed pads of FIG. 10 after strength testing.

The part precursors were also qualitatively tested for green part strength using tweezers. The strength tested part precursors are shown in FIG. 11. For this print, the part precursors got to a maximum temperature of about 145° C., which was not hot enough to form strong parts, as depicted in FIG. 11.

Using the identified contone level of 1000, another part precursor was printed with the same fluid and build material particles. Some of the other printing parameters were slightly adjusted in order to further minimize fluid bubbling and increase strength, as shown in Table 8. Four heating events with the conditions set forth in Table 9 were used for this part.

TABLE 8

| Pad # | Distributor Speed (ips) | Layer Height (µm) | Print Temp. (° C.) | Fluid Loading (contone level) | Fluid Timing | Delay Time (s) |
|---|---|---|---|---|---|---|
| 18 | 2 | 100 | 106 | 1000 | Single application | 5 |

TABLE 9

| Heating Event # | # Heat Lamps ON | Heating Speed (ips) |
|---|---|---|
| 1 | 1 | 7 |
| 2 | 1 | 7 |
| 3 | 2 | 6 |
| 4 | 1 | 7 |

This subsequent print brought the temperature to about 160° C. during the sintering of the nanoparticles, which resulted in a stronger part precursor that could be handled. This part precursor exhibited no bubbling and also had a smooth surface topology.

Example 4

In this example, two example part precursors (in the form of bars) were formed were with the silver nanoparticle fluid described in Example 2. Comparative part precursors (also in the form of bars) were prepared using molds, and either the silver nanoparticle fluid or a copper metal nanoparticle ink from Promethean Particles. The metal build material particles were a 50 µm copper powder from Goodfellow.

The example part precursors were formed by the method described in Example 2, except that the nanoparticle fluid loading was about 6 vol. %. The other printing parameters were as shown in Table 3 (Example 2). The heating events were the same as shown in Table 4 (Example 2).

For the comparative part precursors, the copper metal powder and the respective metal nanoparticle fluids (at different loadings ranging from about 1 vol % to about 3.5 vol %) were mixed together to form a paste which was cast into a mold. The mold was then placed on a hotplate at a temperature ranging from about 90° C. to about 120° C. for 5 minutes to evaporate the fluid components. The comparative part precursors that were formed were then removed from the mold and heated to 375° C. for about 10 minutes.

The example and comparative example part precursors were then broken using a force gauge, with the maximum force required for breaking being recorded. Using beam mechanics equations, the strength of the example and comparative example part precursors was determined using the geometry of the respective part precursor and the beam testing setup in combination with the force required for breaking.

Figure 12:
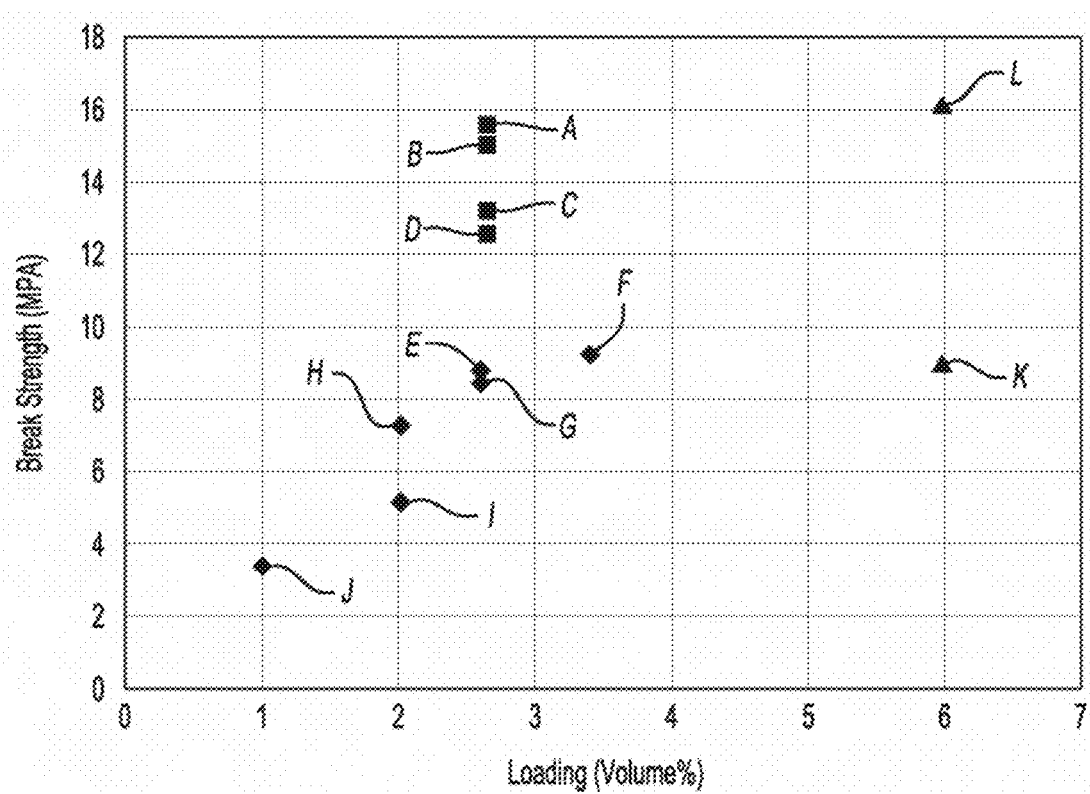
FIG. 12 is a graph of breaking (or break) strength (Y-axis, in MPa) versus nanoparticle loading (X-axis, in Vol. %) for example and comparative example part precursors.

FIG. 12 depicts the breaking strength (MPa, Y-axis) versus the loading of the nanoparticle fluid for the example part precursors (examples K and L), the comparative example part precursors formed with copper nanoparticles (Comp. examples E-J), and the comparative example part precursors formed with silver nanoparticles (Comp. examples A-D). The raw data for FIG. 12 is shown in Table 10.

TABLE 10

| Part Precursor | Metal Nanoparticles | Break Strength (MPa) | Volume % Loading |
|---|---|---|---|
| Comp. A | Silver | 15.580 | 2.650 |
| Comp. B | Silver | 15.019 | 2.650 |
| Comp. C | Silver | 13.210 | 2.650 |
| Comp. D | Silver | 12.562 | 2.650 |
| Comp. E | Copper | 9.247 | 3.404 |
| Comp. F | Copper | 8.798 | 2.605 |
| Comp. G | Copper | 8.449 | 2.605 |
| Comp. H | Copper | 7.283 | 2.015 |
| Comp. I | Copper | 5.164 | 2.015 |
| Comp. J | Copper | 3.388 | 1.008 |
| Example K | Silver | 8.964 | 5.979 |
| Example L | Silver | 16.125 | 5.979 |

This Example provides a quantitative basis for the qualitative breaking measurements in Example 2 and 3. The example and comparative part precursors provide quantitative data for calibrating the qualitative results in Examples 2 and 3. Several of the comparative examples were also breakable with tweezers (e.g., Comps. I and J) and the examples and several of the comparative examples were not breakable with tweezers (e.g., Comps, A-H), and thus these results provide a correlation between the qualitative results and the quantitative results.

It is to be understood that the ranges provided herein include the stated range and any value or sub-range within the stated range. For example, a range from about 10 μm to about 500 μm should be interpreted to include not only the explicitly recited limits of from about 10 μm to about 500 μm, but also to include individual values, such as 11 μm, 25.5 μm, 254 μm, 470.85 μm, etc., and sub-ranges, such as from about 15.5 μm to about 465 μm, from about 150 μm to about 375 μm, from about 115 μm to about 385 pin, etc. Furthermore, when "about" or the symbol is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
at a print temperature:
forming a layer of metal build material particles, the layer having a predetermined height; and
selectively applying a fluid containing metal nanoparticles to at least a portion of the layer, and at a fluid loading that wets the portion through the predetermined height without saturating the portion;
exposing the metal nanoparticles to a sintering temperature that is higher than the print temperature and at least 500° below a melting point of the metal build material particles using a predetermined number of heating events taking place at a predetermined speed or for a predetermined time, and separated by a predetermined delay time that has been identified to at least substantially avoid fluid bubbling during the exposing and at least substantially avoid oxidation of the metal build material particles during the exposing, thereby binding the metal build material particles together to form a bound layer;
cooling a build material surface to or below the print temperature; and
then repeating the forming, the selectively applying, the exposing, and the cooling to form a part precursor.

2. The 3D printing method as defined in claim 1 wherein the repeating of the forming of the layer involves spreading an additional layer of the metal build material particles on the bound layer using a spreading speed that prevents movement of the bound layer.

3. The 3D printing method as defined in claim 1 wherein the selectively applying of the fluid takes place during a single application.

4. The 3D printing method as defined in claim 1 wherein the predetermined height ranges from about 10 μm to about 500 μm.

5. The 3D printing method as defined in claim 1, further comprising selecting the print temperature to:
at least substantially avoid fluid splashing; and
reduce a time for the build material surface to cool to or below the print temperature.

6. The 3D printing method as defined in claim 5 wherein the print temperature ranges from about 100° C. to about 200° C.

7. The 3D printing method as defined in claim 1 wherein the predetermined delay time ranges from about 5 seconds to about 10 seconds.

8. The 3D printing method as defined in claim 1 wherein:
   the predetermined number of heating events ranges from 1 to 8;
   the predetermined speed ranges from about 0.8 inches per second (ips) to about 10 ips; and
   the predetermined delay time ranges from about 5 seconds to about 10 seconds.

9. The 3D printing method as defined in claim 1, further comprising sintering the part precursor at a temperature greater than 400° C. to form a part.

10. The 3D printing method as defined in claim 1, further comprising performing the method in an inert environment.

11. The 3D printing method as defined in claim 1, further comprising:
   receiving a feedback temperature during the forming, the selectively applying, the exposing, and the cooling; and
   utilizing the feedback temperature to dynamically determine a subsequent print action.

12. A 3D printing method, comprising:
   at a print temperature ranging from about 155° C. to about 175° C.:
   forming a layer of copper build material particles, the layer having a height ranging from about 50 μm to about 110 μm; and
   selectively applying a fluid containing silver nanoparticles to at least a portion of the layer, and at a fluid loading that wets the portion through the height without saturating the portion;
   exposing the silver nanoparticles to a sintering temperature that is higher than the print temperature and at least 500° below a melting point of the copper build material particles using from 5 to 7 separate heating events taking place i) at a speed ranging from about 4 ips to about 8 ips, ii) for a time ranging from about 90 seconds to about 5 minutes, or iii) a combination of i and ii, and separated by a delay time ranging from about 5 seconds to about 10 seconds, thereby binding the copper build material particles together to form a bound layer;
   cooling a build material surface to or below the print temperature; and
   then repeating the forming, the selectively applying, the exposing, and the cooling to form a metal part precursor.

13. The 3D printing method as defined in claim 12 wherein the repeating of the forming of the layer involves spreading an additional layer of the copper build material particles on the bound layer using a spreading speed that prevents movement of the bound layer.

14. The 3D printing method as defined in claim 12 wherein the selectively applying of the fluid takes place during a single application.

15. The 3D printing method as defined in claim 12, further comprising sintering the metal part precursor at a temperature greater than 400° C. to form a part.

16. The 3D printing method as defined in claim 12, further comprising performing the method in an inert environment.

* * * * *